Patented Apr. 22, 1947

2,419,246

UNITED STATES PATENT OFFICE 2,419,246

METHOD OF MAKING LEAD PIGMENTS

Louis E. Barton, Windsor, Conn.

No Drawing. Application April 12, 1943,
Serial No. 482,821

8 Claims. (Cl. 23—51)

My process relates generally to methods of making lead compounds by solid phase reaction. More particularly my process relates to the preparation of lead pigments by solid phase reaction.

The prior art literature relating to the formation of lead compounds by solid phase reaction discloses the preparation of such products by heating mixtures of lead oxide and acidic oxides. In the formation of such compounds by solid phase reaction one of the major difficulties is the preparation of a mixture in which the reacting ingredients are brought into and maintained in contact. Furthermore, during the heating operation the formation of a layer of the desired product on the surfaces of ingredients retards the reaction and may prevent its completion. It is one of the objects of my process to provide means for making a more intimate mixture of the ingredients which will more rapidly and completely combine in the solid phase thus avoiding the usual difficulties referred to. Such improvement is accomplished by using metallic lead instead of lead oxide. I mill together metallic lead and the acidic oxides until the ingredients are fine and the acidic oxides are thoroughly coated with metallic lead, thus yielding a more intimate mixture which when heated more readily and completely reacts to form the desired compounds by solid phase reaction than is possible when the mixture is primarily made with lead oxide.

I have discovered that metallic lead can be used advantageously to supply the lead for the formation of lead compounds in the solid phase. By blending, particularly by milling together, metallic lead with an acidic oxide, for example, silica, the particle size of the acidic oxide is greatly reduced as well as that of the lead and the acidic oxide becomes coated with lead giving a more perfect blend which when heated is quickly oxidized with formation of a nascent or active form of lead oxide. As a result it is possible to combine the ingredients of the mixture in the solid phase at the lowest temperature of the permissible range and to complete the formation of the product in the shortest possible time to produce a pigment of greatly improved hiding power and tinting strength. Not only does the use of metallic lead have the special advantages described but its use results in economy since the lead compounds, for example, lead oxide, must be prepared using metallic lead as the primary material.

My improvement in the method of making lead compounds by solid phase reaction, comprising the use of metallic lead as described, is applicable in the preparation of either single lead compounds, such as lead silicate and lead aluminate, or compounds of lead with two or more acidic oxides, such as lead zirconium silicate. My improved method is applicable, for example, in making the products of the following patents the processes of which are now briefly described.

In my copending application Serial No. 359,769, filed October 4, 1940, I have disclosed that essentially pure useful opaque lead silicate pigments can be made by heating a mixture of lead oxide, or a lead compound which upon heating yields lead oxide, and silica (silicon dioxide, $SiO_2$) under controlled temperature conditions whereby the reaction to form lead silicate takes place in the solid phase without fusion. See Example 1 of the instant case.

In my patent application Serial No. 428,035 filed in the United States Patent Office January 24, 1942, I have disclosed a method of making an essentially pure stable lead silicate pigment which comprises adding to the mixture of lead oxide and silica a compound which will supply to the final pigment only a halogen in amount not over 5% of the product and then heating the mixture until the lead oxide and silica chemically combine in the solid phase. See Examples 5, 6 and 7 of the instant case.

In my United States Patent 2,273,825 dated February 24, 1942, I have disclosed a method of making a stabilized lead aluminate pigment which comprises intimately blending a mixture of lead oxide, alumina and silica, the silica being in amount in the range 0.1 to 5% of the final product and then heating the mixture to chemically combine the ingredients in the solid phase. See Example 2 of the instant case.

United States Patent No. 2,140,222 dated December 13, 1938, discloses a method of making lead titanate which comprises mixing lead oxide and titanium oxide and then heating the mixture until the oxides chemically combined in the solid phase. See Example 3 of the instant case, showing the working of the process when metallic lead is used instead of lead oxide.

United States Patent No. 2,215,737 dated September 24, 1940, discloses a method of making lead zirconium silicate which comprises mixing lead oxide and zircon (a compound of zirconium oxide and silica) and then heating the mixture until the ingredients combine in the solid phase. See Example 4 of the instant case, showing the working of the process when metallic lead is used instead of lead oxide.

My improved method comprising the use of metallic lead instead of lead oxide is also equally applicable in making the products of the following patents which relate to solid phase reaction processes: U. S. Patent 2,233,042, February 25, 1941—Lead silicate; U. S. Patent 2,236,051, March 25, 1941—Lead silicate; U. S. Patent 2,277,061, March 24, 1942—Lead aluminate; U. S. Patent 2,277,062, March 24, 1942—Lead aluminate; U. S. Patent 2,277,063, March 24, 1942—Lead aluminate; U. S. Patent 2,197,604, April 16, 1940—Lead zinc alumino-silicate; U. S. Patent 2,197,605, April 16, 1940—Lead zinc silicate; U. S. Patent 2,127,844, August 23, 1938—Lead zirconate.

Lead in most any degree of subdivision can be used but for economy it is preferable to use such materials as granulated lead, lead wool and powdered or, so-called, atomized lead made by well-known processes.

Commercially pure stocks of acidic oxides, preferably in the form of powders, are suitable, such for example, as silica, alumina, titanic oxide and zirconia or such materials as zircon or zirconium silicate. Compounds which yield or supply to the product only the acidic oxides upon heating are also available and in some cases preferable; such, for example, as aluminum and titanium hydrates.

If powdered lead and fine acidic oxides or compounds are used the ingredients may be thoroughly mixed and then heated to complete oxidation of the lead and formation of the lead compound in the solid phase. Usually the ingredients, particularly the acidic oxides, are not commercially supplied with particle size fine enough to give the best results as regards tinting strength of the pigment; therefore it is then necessary to mill them, or preferably to mill them together, thus reducing particle size and thoroughly coating the acidic oxide with lead.

If such materials as granulated lead and lead wool are used it is necessary to mill the ingredients. The lead and acidic oxides may be separately milled and then mixed but I prefer to mill the ingredients together, at least in the final stages of milling. The relatively sharp acidic oxides assist in milling the metallic lead and become coated with a film of lead.

Either dry or wet-milling methods can be used for blending the ingredients of the mixture. As well known, metallic lead quickly becomes coated with a film of oxide when exposed to the atmosphere. In the presence of water hydration of the lead takes place as well as the formation of some lead carbonate due to carbon dioxide in the atmosphere. The total oxidation during wet-milling results in a mixture which contains considerable oxidized lead, the amount depending upon the equipment used and atmospheric exposure. If air is blown over or through the charge during the wet-milling the formation of oxidized lead is very much greater. Optionally, burner gases from the calcining furnace may be passed over or through the charge while wet-milling, in which case the blended mixture will contain a considerable amount of lead carbonate or hydrated lead carbonate. Under some conditions the oxidation may be substantially complete.

My co-pending patent application Serial No. 428,035 and issued Patents Numbers 2,233,042 and 2,236,051, before referred to, disclose the use of pigment stabilizers and reaction accelerators added in small quantities. I have found my process comprising the use of metallic lead in the mixture of ingredients is well adapted to processes involving such variations as well as my other processes of making lead silicates and lead aluminates before referred to. The stabilizers and reaction accelerators can be used in dry-blended mixtures but such reagents as the halides of group II of the periodic system referred to in my Patent No. 2,233,042 and the halogen acids and ammonium halides referred to in my co-pending application Serial No. 428,035, which are soluble in water, are more thoroughly dispersed in the charge if wet-blending methods are used. Furthermore there should be enough oxidized lead in the mixture to react completely with the small amounts of water-soluble accelerating-stabilizing reagents, so that, if desired, the blended slurry can be partially dewatered before calcining without losing any of the added reagent. Ordinarily in wet-milling there will be enough oxidized lead present by the time the materials are milled fine enough, but if not, the milled charge can be exposed to the atmosphere in any convenient manner to form more oxidized lead compounds. However the fresh metallic lead surfaces formed during the wet-milling react more rapidly with the atmosphere than do lead particles already coated with a film of oxide; therefore it is preferable to accomplish the milling and oxidation simultaneously. The degree of oxidation of a mixture can be easily determined by analysis and may also be judged by the color after a little experience. Dry-milled charges and wet-milled charges containing very little oxide, have a very dark gray color. The greater the amount of oxidized lead compound present, the lighter will be the color.

For reasons stated and because wet-blended mixtures are applicable in preparing all my lead silicate and lead aluminate pigments and also because mixtures so prepared yield the best final pigment products, I prefer to conduct the blending operation as follows: The metallic lead and acidic oxide are wet-milled together. Any suitable equipment may be used, such as a silica or silex lined mill with flint pebbles. The mill should have openings for introduction and exit of air. While milling air is passed into the mill, or optionally air containing carbon dioxide. The amount of water for wet-milling will depend on the nature of the ingredients and type and size of mill. The correct amount of water to give most efficient grinding for any particular set of conditions is easily determined by experience. When the charge has been milled fine enough, the acidic oxides thoroughly coated with metallic lead and the lead sufficiently oxidized, the accelerating stabilizing compound, if such is to be used, is added and milling continued for a short time until the reagent and its reaction products are thoroughly dispersed throughout the mixture.

Various types of furnaces can be used for calcining the mixture. A lining of good grade fire brick is satisfactory. If the mixture has been wet-milled the slurry from the mill (partially dewatered as by settling and decantation if desired) can be charged directly to the furnace or the mixture may be first dried and then charged into the furnace. The drying is accomplished with the waste heat from the calcining furnace. Whether wet or dry milled, any metallic lead remaining in the mixture is rapidly oxidized below the temperature at which the lead and acidic oxide combine to form the product in the solid phase. The temperature range during calcining is indicated in the patent literature before referred to and further indicated in the following examples of operation.

If the operating conditions are carefully controlled the calcined product will in most cases require no milling but the product may be dry-milled or wet-milled if desired. For example, if the hydrated form of lead aluminate disclosed in my Patent No. 2,277,061 is required, final wet-milling is indicated.

The following examples illustrate the working of my process:

Example 1.—Lead silicate 46.5 parts of metallic lead (lead wool), equivalent to 50 parts PbO and 50 parts of silica, were dry-milled together for 12 hours. The resulting very dark gray powder when heated oxidized rapidly in the temperature range 320 to 400° C. Calcined for 2 hours in the temperature range 590 to 610° C. The cream white powder had a granular texture and a tinting strength of 50 compared with standard white lead taken as 100 tinting strength.

Example 2.—Lead aluminate 46.5 parts of metallic lead (granulated lead), equivalent to 50 parts PbO and 72.5 parts of aluminum hydrate $Al(OH)_3$ equivalent to 48 parts $Al_2O_3$ and 2 parts of silica to act as stabilizer were wet-milled for 5 hours and the slurry dried. The dry mixture was then calcined for 2 hours at 675 to 690° C. The white product had a soft texture and tinting strength of 100, equal to that of standard white lead.

Example 3.—Lead titanate 68.3 parts of granulated lead, equivalent to 73.6 parts of PbO and 26.4 parts of titanic oxide were wet-milled together for 6 hours and the slurry dried. The dry mixture was then calcined 4 hours at 680 to 710° C. The resulting cream white pigment had a soft texture and a tinting strength of 750 compared with standard white lead taken as 100.

Example 4.—Lead zirconium silicate 45.1 parts of zircon, $ZrSiO_4$, and 51 parts of granulated lead, equivalent to 54.9 parts of PbO were wet-milled together for 7 hours and the slurry dewatered and dried. The dry mixture was then calcined for 3 hours at a temperature of 640 to 740° C.

The ivory white pigment was slightly granular but very easily milled. The tinting strength was 175 compared with standard white lead taken as 100.

Example 5.—Lead silicate 46.5 parts of metallic lead (lead wool), equivalent to 50 parts of PbO, and 50 parts of silica were dry-milled for 12 hours. 4.52 parts of ammonium chloride, equivalent to 3 parts of chlorine was then added, as accelerator, and milling continued for 2 hours. The mixture was then calcined 2½ hours in the temperature range 420 to 485° C. The white pigment had a soft texture and a tinting strength of 150 compared with standard white lead taken as 100.

Example 6.—Lead silicate 46.5 parts of metallic lead (lead wool), equivalent to 50 parts of PbO, and 50 parts of silica were wet-milled together for 11 hours. 11.25 parts of 36.5% HCl, equivalent to 4 parts of chlorine, were then added and the charge milled 1 hour longer. The slurry was dewatered and dried. The decanted liquid was neutral. The dried mixture was then calcined for ¾ hour at 410 to 440° C. The white pigment had a soft texture and a tinting strength of 165 compared with standard white lead taken as 100.

Example 7.—Lead silicate 65 parts of granulated lead, equivalent to 70 parts of PbO, and 31.7 parts of silica were wet-milled for 8½ hours while passing a current of air over the charge during the milling. 11.25 parts of 36.5% HCl, equivalent to 4 parts of chlorine, were added and milling continued 1 hour longer. The slurry was dewatered and dried. The dry mixture was then calcined for ¾ hour in the temperature range 450 to 490° C. The cream white pigment had a very soft texture and a tinting strength of 255 compared with standard white lead taken as 100.

I claim as my invention:

1. The method of making lead pigments by chemical combination of lead and acidic oxides in the solid phase which comprises intimately blending by milling together metallic lead and compounds which upon heating will supply to the product only oxides which are acidic in relation to lead oxide, during which blending the acidic oxides are reduced in particle size and thoroughly coated with metallic lead and then heating the mixture in an oxidizing atmosphere until the lead is oxidized and the lead oxide chemically combined with the acidic oxides in the solid phase without fusion.

2. The method of making lead pigments by chemical combination of lead and acidic oxides in the solid phase which comprises intimately blending by milling together metallic lead and compounds which upon heating will supply to the product only oxides of groups III and IV of the periodic system which are acidic in relation to lead oxide, during which milling the lead and acidic oxides are reduced in particle size and the said oxides thoroughly coated with metallic lead and then heating the mixture in an oxidizing atmosphere until the lead is oxidized to PbO and the lead oxide chemically combined with the said acidic oxides in the solid phase without fusion.

3. The method of making essentially pure, opaque, white, lead silicate pigments which comprises intimately blending by wet-milling metallic lead and a compound which upon heating will supply to the pigment product only silica, the milling being continued until the silicon compound is thoroughly coated with metallic lead and then heating the mixture in an oxidizing atmosphere until the lead is oxidized to PbO and the lead oxide chemically combined with the silica in the solid phase.

4. The method of making essentially pure, opaque, white, lead silicate pigments which comprises intimately blending by wet-milling metallic lead and a compound of silicon which upon heating will supply to the pigment product only silica, the milling being continued until the silicon compound is thoroughly coated with metallic lead while causing partial oxidation of the lead by exposing the mixture to the atmosphere during the milling, adding a reaction-accelerating stabilizing reagent which upon heating will supply to the pigment product only a halogen element, continuing the milling until the halogen compound has reacted with oxidized lead and finally heating the mixture in an oxidizing atmosphere until the lead is oxidized to PbO and the lead oxide chemically combined with the silica in the solid phase.

5. The method of making essentially pure, opaque, white, lead silicate pigments which comprises intimately blending by wet-milling metallic lead and silica, the milling being continued until the silica is thoroughly coated with metallic lead while causing partial oxidation of the lead by exposing the mixture to oxidizing gases during the milling, adding a halogen acid in amount to supply to the pigment product not more than 5% of a halogen element, continuing the milling until the halogen acid has reacted with oxidized lead and finally heating the mixture in an oxidizing atmosphere until the lead is oxidized to PbO and the lead oxide chemically combined with the silica in the solid phase.

6. The method of making essentially pure, opaque, white, lead aluminate pigments which comprises intimately blending by wet-milling metallic lead and a compound which upon heating will supply to the pigment product only alumina, continuing the milling until the aluminum compound is thoroughly coated with metallic lead and then heating the mixture in an oxidizing atmosphere until the lead is oxidized to PbO and the lead oxide chemically combined with the alumina in the solid phase.

7. The method of making essentially pure, opaque, white, lead aluminate pigments which comprises intimately blending by wet-milling metallic lead and compounds which upon heating will supply to the pigment product respectively only alumina and silica, the silica being within the range 0.1 to 5% of the pigment, continuing the milling until the aluminum compound is thoroughly coated with metallic lead and then heating the mixture in an oxidizing atmosphere until the lead is oxidized to PbO and the lead oxide chemically combined with the silica and aluminum oxide in the solid phase.

8. The method of making essentially pure, opaque, white, lead titanate pigments which comprises intimately blending by wet-milling metallic lead and a compound which upon heating will supply to the pigment only titanic oxide, the milling being continued until the titanium compound is thoroughly coated with metallic lead and then heating the mixture in an oxidizing atmosphere until the lead is oxidized and chemically combined with the titanic oxide in the solid phase.

LOUIS E. BARTON.

REFERENCES CITED

The following references are of record in the file of this patent:

UNITED STATES PATENTS

| Number | Name | Date |
|---|---|---|
| 2,233,043 | Barton | Feb. 25, 1941 |
| 1,482,327 | Thibault | Jan. 29, 1924 |
| 1,584,150 | Shimadzue | May 11, 1926 |
| 1,556,820 | Hocking | Oct. 13, 1925 |
| 1,985,465 | Schimadzue | Dec. 25, 1934 |
| 1,992,395 | Rose et al. | Feb. 26, 1935 |
| 2,215,737 | Kinzie | Sept. 24, 1940 |

FOREIGN PATENTS

| Number | Country | Date |
|---|---|---|
| 378,799 | British | Feb. 18, 1932 |

OTHER REFERENCES

Treatise on Chemistry, Roscoe Schorlemmer, vol. II, page 864 (copy in Div. 59,) MacMillan & Co., Ltd., 1907.

Hogg Journal of Soc. of Chem. Indust., vol VIII, 1889, pages 684–685.

Hedvall et al., Chem. Abst., vol. 30, page 2511, 1936. (Copy Scientific Lib.)

Jogitsch Shem. Abst., vol. 30, page 7980, 1936. (Copy Scientific Lib.)